United States Patent [19]

Beck

[11] Patent Number: 4,785,571

[45] Date of Patent: Nov. 22, 1988

[54] FISH HOOK WITH LIVE BAIT HOLDER

[76] Inventor: Gilbert F. Beck, 1342 Three Mile Dr., Grosse Pointe Park, Mich. 48230

[21] Appl. No.: 155,127

[22] Filed: Feb. 11, 1988

[51] Int. Cl.[4] ............................................. A01K 83/06
[52] U.S. Cl. ........................................................ 43/44.4
[58] Field of Search ...................... 43/44.4, 44.8, 44.2

[56] References Cited

U.S. PATENT DOCUMENTS

| | | | |
|---|---|---|---|
| 649,508 | 5/1900 | Crosby | 43/44.2 |
| 1,323,394 | 12/1919 | Jones | 43/44.8 |
| 1,613,113 | 1/1927 | Leu | 43/44.4 |
| 2,795,885 | 6/1957 | Imberti | 43/44.4 |
| 2,982,049 | 5/1961 | Yost | 43/44.4 |
| 3,193,965 | 7/1965 | Jacobsen | 43/44.4 |

OTHER PUBLICATIONS

Popular Mechanics, vol. 104, No. 3, Sep. 1955, p. 100, 43-44.8.

Primary Examiner—Nicholas P. Godici
Assistant Examiner—J. Reed Batten, Jr.
Attorney, Agent, or Firm—Barnes, Kisselle, Raisch, Choate, Whittemore & Hulbert

[57] ABSTRACT

A fish hook having an elastic strip secured at spaced points to the shank of the fish hook and cooperable with the shank to hold live bait, such as a minnow or the like. At least one end of the elastic strip is releasably secured to the shank of the fish hook so that the elastic strip may be shortened and lengthened to adjust the tension on the bait.

2 Claims, 1 Drawing Sheet

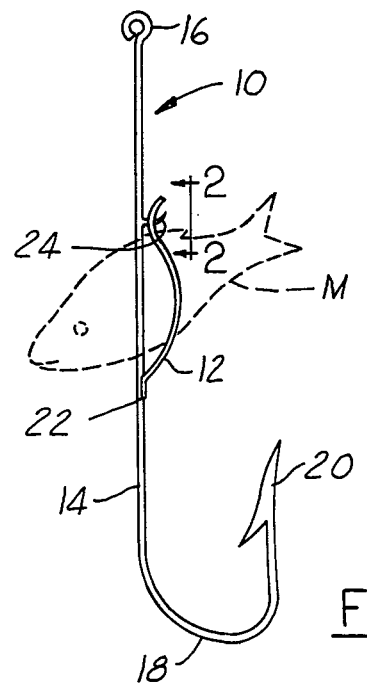
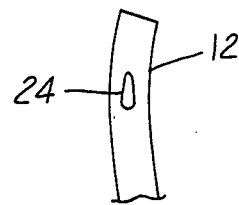
FIG. 1
FIG. 2
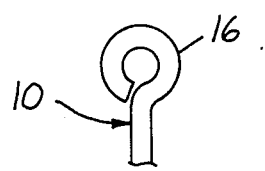
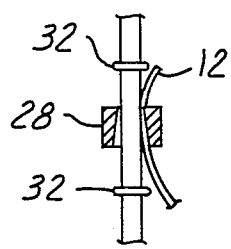
FIG. 4
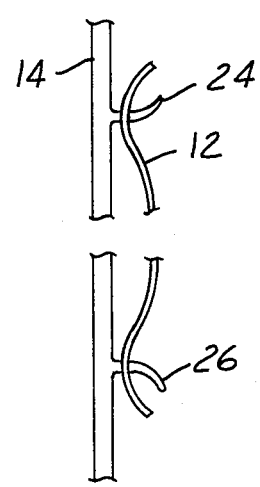
FIG. 3

FISH HOOK WITH LIVE BAIT HOLDER

This invention relates generally to fish hooks and refers more particularly to a fish hook with a live bait holder.

BACKGROUND AND SUMMARY OF THE INVENTION

Fish hooks with bait holders developed in the past are such that they either kill the bait or are so complicated and expensive as to be impractical. Examples of fish hooks with associated bait holders are disclosed in the following U.S. Pat. Nos. 622,206—Claflin, 2,463,369—Finley et al., 3,197,912—Kramer, 3,271,890—Davis, 3,398,477—Paluzzi, 4,471,558—Garcia.

The object of this invention is to provide a fish hook with extremely simple and inexpensive means for releasably securing live bait to the shank of the fish hook without killing or even harming the bait.

The fish hook disclosed in this application provides such a securing means for the bait which comprises an elongated elastic strip secured at both ends to the shank of the fish hook. The elastic strip is stretchable and cooperates with the shank to retain the live bait between the shank and the elastic strip.

In accordance with specific embodiments disclosed and hereinafter described, at least one end of the elastic strip is releasably secured to the fish hook shank in a manner such that it may be shortened or lengthened to adjust tension.

These and other objects of the invention will become more apparent as the following description proceeds, especially when considered with the accompanying drawing.

BRIEF DESCRIPTION OF THE DRAWING

FIG. 1 is a side elevational view of a fish hook with live bait holder, constructed in accordance with the invention.

FIG. 2 is a fragmentary view in elevation taken along the line 2—2 on FIG. 1.

FIG. 3 is a fragmentary elevation, with parts broken away, of a modification.

FIG. 4 is similar to FIG. 3 and shows a further modification.

DETAILED DESCRIPTION

Referring now more particularly to the drawing and especially to FIGS. 1 and 2, the numeral 10 designates a more or less conventional fish hook, and the numeral 12 designates an elongated stretchable, elastic strip of rubber or the like secured to and extending lengthwise along the shank 14 of the fish hook.

The fish hook 10 has an eye 16 at one end of the shank 14 for attachment to a fishing line. The other end of the shank has a return-bent portion 18 which terminates in a barb 20.

The elastic strip 12 has one end portion 22 secured to the shank of the fish hook in any suitable manner, as by adhesive, for example.

Spaced from the strip end portion 22 in a direction toward eye 16, there is provided a pointed prong 24 which projects laterally outwardly from the shank of the fish hook and preferably is curved slightly in a direction away from the barbed end of the fish hook. The other end portion of the strip is secured to the prong by being impaled thereon, that is by being pressed against the point of the prong so that the prong pierces a hole in the strip. The prong may pierce the elastic strip at any selected point along its length, depending upon the amount of tension desired in the elastic strip. The elastic strip may be pulled taut and then pierced by the prong, or a small amount of slack may be provided between the fixed end portion 22 of the strip and the end portion pierced by the prong.

A minnow M or other live bait, shown in dotted lines in FIG. 1, is retained by the elastic strip in cooperation with the shank of the fish hook by placing the bait in the space between the shank and elastic strip. The body of the minnow will stretch the elastic strip enough to lightly but firmly hold the minnow.

In use, the elastic strip may be allowed to hang freely from its secured end portion 22 and a live minnow placed against the shank of the fish hook. Then the elastic strip is extended over the body of the minnow with enough tension to hold the minnow so that it cannot escape, but doing no harm to the minnow. The free end portion of the elastic strip is pressed against the pointed prong 24 so that the prong pierces the elastic strip and secures that end portion of the elastic strip to the shank. If there is not enough tension, or too much tension, in the elastic strip for holding the bait without injury, the free end portion of the elastic strip may be released from the prong and reattached in the same manner, but at a different selected point along the length of the elastic strip.

While FIG. 1 shows only one end of the elastic strip secured by a pointed prong, the other end portion being permanently affixed as by adhesive, clearly both end portions of the elastic may be secured in place by prongs. FIG. 3 shows a modification in which a portion of a fish hook has two prongs spaced apart along the length of the shank, the prong 24 nearer to the eye of the hook being identical to the one shown in FIGS. 1 and 2, and the other prong 26 being similarly constructed but oppositely curved, that is curved in a direction toward the barbed end of the fish hook. With this modified construction of FIG. 3, obviously both ends of the elastic strip are releasably, adjustably secured to the shank and with the prongs piercing the opposite end portions of the elastic strip at selected points along the length of the elastic strip.

FIG. 4 shows a further modification in which both ends of the elastic strip are secured in a releasable, adjustable manner by means of rings 28 and 30. The ring 28 is sleeved on the shank of the fish hook between spaced circular abutments 32 so that it is capable of limited longitudinal movement along the length of the shank. The inside of the ring 28 is axially tapered so that its upper end (when the fish hook is positioned with its "eye" end uppermost) is larger in diameter than the shank of the fish hook by an amount somewhat less than the thickness of the elastic strip. The opposite end of the inside of the ring is larger in diameter than the shank of the fish hook by an amount somewhat greater than the thickness of the elastic strip.

Accordingly, the elastic strip may be fed into the space between the shank and the ring from beneath the ring as viewed in FIG. 4 and then the ring may be slide down along the shank over the elastic strip, in the process compressing one end portion of the elastic strip and thereby releasably securing it to the shank of the fish hook.

The ring 30 is identical to the ring 28 although it is reversed end for end so that its large inside diameter portion is above rather than below its small inside diameter portion. This ring 30 likewise is capable of sliding longitudinally along the shank between spaced circular abutments 34. The opposite end of the elastic strip is secured by the ring 30 in cooperation with the shank in the same manner as the upper end portion of the elastic strip, except that it is fed into the upper end of the ring and the ring then slid in an upward direction to squeeze and thereby compress and secure the opposite end portion of the elastic strip in adjusted position.

Obviously the FIG. 4 construction permits the length of the elastic strip to be varied as desired to adjust the tension.

I claim:

1. A fish hook having an elongated shank provided with a return-bent portion terminating in a barb, and means for releasably securing live bait such as a minnow to said shank without harming the bait comprising an elongated elastic strip, first retainer means for securing one end portion of said elastic strip to said shank, and second retainer means spaced from said first retainer means for releasably, adjustably securing the other end portion of said elastic strip to said shank, said second retainer means comprising a pointed prong piercing said strip at a selected point along its length, said strip being stretchable and cooperable with said shank to retain live bait between said shank and said elastic strip.

2. A fish hook having an elongated shank provided with a return-bent portion terminating in a barb, and means for releasably securing live bait such as a minnow to said shank without harming the bait comprising an elongated elastic strip, first retainer means for releasably, adjustably securing one end portion of said elastic strip to said shank, and second retainer means spaced from said first retainer means for releasably, adjustably securing the other end portion of said elastic strip to said shank, said first and second retainer means each comprising a pointed prong piercing said strip at a selected point along its length, said strip being stretchable and cooperable with said shank to retain live bait between said shank and said elastic strip.

* * * * *